Jan. 11, 1966 J. M. BROWNLOW ETAL 3,229,265

ARRAYS OF MAGNETIC CIRCUIT ELEMENTS

Filed June 29, 1962

INVENTORS
JAMES M. BROWNLOW
KURT R. GREBE

BY

ATTORNEY

United States Patent Office 3,229,265

Patented Jan. 11, 1966

3,229,265

ARRAYS OF MAGNETIC CIRCUIT ELEMENTS

James M. Brownlow, Crompond, and Kurt R. Grebe, Beacon, N.Y., assignors to International Business Machines Corporation, New York, N.Y., a corporation of New York Filed June 29, 1962, Ser. No. 206,326
7 Claims. (Cl. 340—174)

This invention relates to a connected array of magnetic circuit elements which are suitable for use as memory planes in digital information storage systems.

Arrays of discrete magnetic storage elements are well known. Most commonly they comprise a planar array of individually fabricated ferrite cores having a single aperture. The cores are threaded with a system of wire conductors with at least three conductors passing through the aperture of each core. The manner of construction and mode of operation are familiar to those skilled in the art. Because of the wiring method, and because the aperture must be of a size to allow threading of three conductors, requiring large excitation currents, the final cost of such arrays remains high.

The connected array of the invention embodies several important features which have led to advantageous improvements in random access memory technology. First, low cost fabrication techniques can be used for fabricating connected array planes having many individual storage elements. Second, the arrays can be made with the wire conductors already in place, thereby eliminating the costly wiring techniques attendant with older core memory arrays. Third, the small aperture size and close spacing of the elements ease the electrical power requirements from associated circuitry in memory operations and reduces total size and weight of the memory. Fourth, the sum of these advantages makes it economically feasible to construct large capacity memories of $10^8$ bits in contrast to the $2\times10^6$ bits capability of alternate techniques.

Other attempts to fabricate arrays, such as multiaperture plates and ferrite bead arrays, have failed to achieve all these advantages, since the multiaperture of the plate cannot be prewired and requires larger drive currents to operate while the ferrite bead concept performs like a ferrite core requiring three wires per storage location. In an array of the present invention however, only two wires are necessary per storage location. Furthermore, the spacing necessary between the neighboring storage elements of the connected array is considerably reduced, thus achieving maximum storage capacity within a minimal space.

An object of this invention is to provide a novel connected array of magnetic storage elements.

A further object of this invention is to fabricate a novel connected array of magnetic storage elements which are particularly adaptable to large capacity memory use.

Still another object of this invention is to provide a novel prewired array of magnetic storage elements.

The foregoing and other objects, features and advantages of the invention will be apparent from the following more particular description of a preferred embodiment of the invention, as illustrated in the accompanying drawings.

Figure 1:
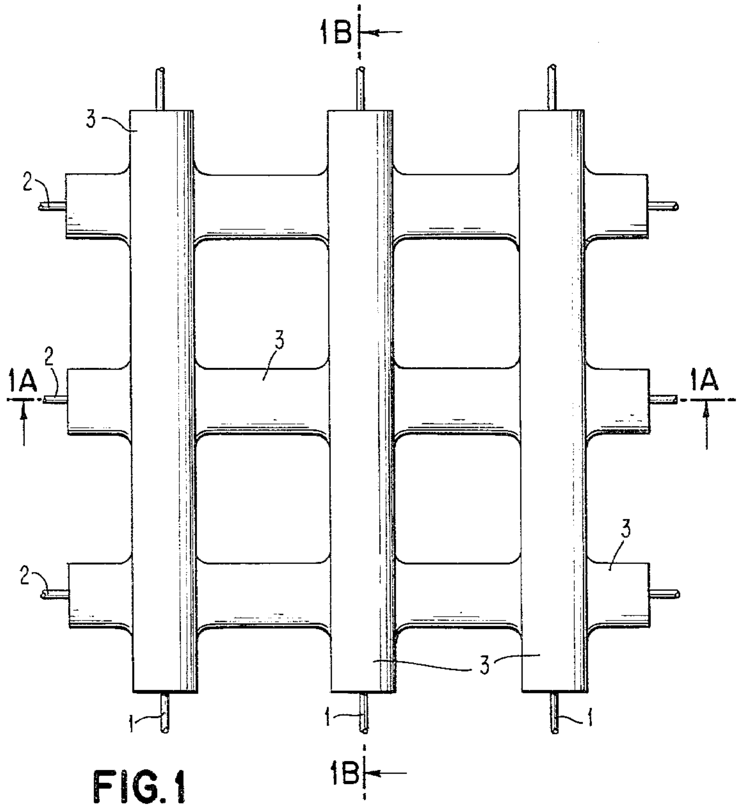
FIGURE 1 is a top plan view of a sintered connected array of ceramic ferrite magnetic material having wire conductors in different planes.

The present invention sets forth a structural principle which yields superior performance for magnetic structures arranged in various geometries surrounding wire conductors. The structural principle also involves a ceramic forming process to make easily fabricated connected arrays of magnetic material at junctions of orthogonally related series of wire conductors. It was discovered that certain junction arrangements could be optimized with respect to minimum interaction between the junctions and with respect to bistable storage performance. The junction could be coincidentally written to a stable flux storage state and distinctly read yielding a 20–60 microvolt sense signal.

The general process which prepares this structure starts with a parallel series of wax coated wires such as palladium. The wire is coated with a liquid ferrite powder-resin mixture and then joined to a second set of similarly coated wires at a 90° angle to the first set. The special geometry of the ferrite junctions or interactions is created in this joining process. This formed assembly is fired to sinter the ferrite and produce thereby a connected array of ceramic ferrite magnetic storage elements.

The metal wire used in the process of the invention must be "dead" annealed platinum, palladium, silver, copper or other suitable electrically conductive alloys. (A "dead" annealed wire is here defined as a wire which has been annealed until it is soft and ductile.) This annealing precludes the distortion of the wire in the subsequent heating steps of the process.

The metal wire is coated with a suitable thickness of a wax-like substance (for example, 1 to 5 mils) depending upon the diameter of the wire. The larger diameter wire conductors require a thicker wax-like coating around the conductors.

The wax-like substance is a substance which melts at a temperature below that at which pyrolysis of the epoxy binder component of the ferrite-resin mixture takes place. Waxes, natural or synthetic, such as those having a melting point in the range 45° C. to 150° C., may be used (e.g. beeswax, carnauba wax, polyethylene wax (Epolene), paraffin wax, etc.). In addition other substances such as polyvinyl acetate, polyvinyl chloride, polyethylene and copolymers of polyvinyl acetate and polyvinyl chloride are also suitable.

It has been found that without a suitable thickness of a wax-like compound, the ferrite shrinkage during firing causes stress, cracks and fractures. The space occupied by the wax provides sufficient room for the firing shrinkage to occur, unrestricted by the wire conductors and thus prevent breakage of the ferrite shell covering.

The wax-treated metal wire is coated with a shell covering of a liquid ferrite-resin mixture by passing it vertically through a bath of fluid-resin mixture adjusted to a predetermined viscosity (20,000–90,000 centipoises), such that a desired shell covering thickness of from 1.0–20 mils is obtained.

The ferrite-resin mixture is formulated as follows: Calcined ferrite powder is dispersed in a thermosetting resin with suitable catalysts, plasticizers and/or viscosity control agents. The calcined ferrite powder is present in an amount 40–80% by weight. The thermosetting resin plus catalyst is present in an amount 5–60% by weight. The plasticizers or viscosity control agents are present in an amount of from 0–30% by weight.

It has been found that most, if not all, calcined ferrite powders which exhibit a substantially square hysteresis loop when sintered are suitable, such as, for example, $$Fe_{1.83}Mn_{1.08}Cr_{.09}O_4,\ Fe_{1.68}Mn_{1.25}Cr_{.06}Ni_{.03}O_4$$

$Fe_{1.7}Mn_{.6}Mg_{.7}O_4$, $Fe_{1.65}Mn_{0.95}Cr_{.10}Zn_{1.25}Cu_{.02}O_4$, etc.

The resins suitable for use with the calcined ferrite powder are thermosetting resins such as, for example, epoxy resins, polyester resins, melamine-formaldehyde resins, phenol aldehyde resins, etc.

The epoxy resin is prepared by the reaction of epichlorohydrin and bisphenol A (e.g. Epon 828). The hardeners or catalysts which are suitable as curing agents for the epoxy resin are for example, metaphenylene diamine, 4, 4′ methylene dianiline, 2,6-diaminopyridine, 4, 4′-chloro-ortho-phenylene diamine, diamino diphenyl sulfone, triethylene tetramine, hexahydrophthalic anhydride and dicyandiamide. Various viscosity control agents such as pine oil, castor oil, epoxidized castor oil, butyl glycidyl ether or a suitable compatible solvent (e.g. a 1:1 mixture of methyl ethyl ketone and amyl acetate) are employed to adjust the viscosity of the final ferrite-thermosetting resin mixture to the desired viscosity range of 20,000–90,000 centipoises. The polyester resin is, for example, an ester formed by reacting an unsaturater dicarboxylic acids and a polyhydric alcohol such as the reaction product of maleic acid and ethylene glycol. Another suitable polyester resin is a reaction product of adipic acid, maleic anhydride, and ethylene glycol. Suitable curing agents for the polyester resins are peroxides for example, methyl ethyl ketone peroxide, benzoyl peroxide or cumene hydroperoxide. The viscosity control agents for such resins may be either pine oil, 1-octene or styrene and may be present in an amount up to 50% by weight of the ferrite-thermosetting resin mixture.

The ferrite-resin coated wires are then mounted on a frame in parallel alignment. A second series of similarly treated coated wires are mounted on a second frame. The two frames are oriented in a "fixture" so that the first series of coated wires is perpendicular to the second series. The two frames are then pressed together to join the corresponding ferrite-resin mixture coatings. During the orienting and joining of the two mounts or frames containing the parallel aligned wires, the fluidity of ferrite-resin mixture is sufficiently low, of the order of 20,000–90,000 centipoises to permit the ferrite-resin coating at the cross joints of the joined wires to flow and intermingle thereby establishing the resin bonded joint. The crossed wires displace the ferrite-resin mixture coating at the junction and approach each other to any desired distance. The wax-like substance surrounding the wires prevents them from making electrical contact. The ferrite-resin mixture coating shells interpenetrate each other and form the desired junction geometry.

This assembly is then cured at a temperature in the range 25° C.–150° C. to cure the thermosetting resin and is slowly heated to 100° C.–150° C. during which time the ferrite-resin mixture coating becomes more strongly bonded and coherent, and the wax component melts and flows out of the structure.

Next, the temperature is raised to 600° C. to decompose and burn and slowly remove the epoxy or polyester resin and plasticizers. The structural arrangement of the formed array during heating and pyrolysis remains unchanged because of the non-violent decomposition reactions that take place in the pyrolysis of the organic components. These particular resins and plasticizers have been so selected to achieve this result.

The sintering is accomplished by heating the pyrolyzed structure to 900° C.–1400° C. to form the polycrystalline ferrite material and thereby produce a connected array of magnetic ferrite material having the desired geometry and magnetic properties. The sintered array thus formed is then cooled to room temperature.

A small array showing nine junctions is shown in FIGURE 1 in a top plan view. The wire conductors in this sintered connected array of ceramic ferrite magnetic material are in different planes. The wire conductors 1 are in one plane and the wire conductors 2 are perpendicular to wire conductors 1 and in another plane. The ferrite ceramic material 3 surrounds wire conductors 1 and 2. A section of the array along lines 1A is shown in FIGURE 1A. The passages occupied by the wire conductors are tangent between the passages of the wires of each plane at each intersection.

Figure 1B:
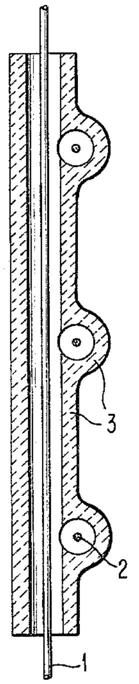
FIGURES 1A and 1B are cross sectional views along lines 1A and 1B respectively showing the structure of the intersection of the ceramic ferrite magnetic material and the position of the conducting wires.
Figure 1A:
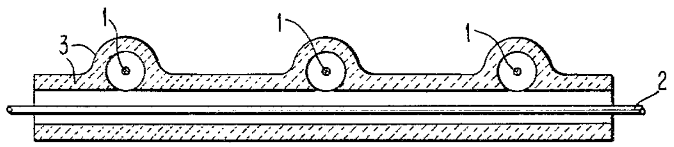

FIGURE 1B discloses the structure of the intersection along line 1B passing through the sintered connected array.

Figure 2:
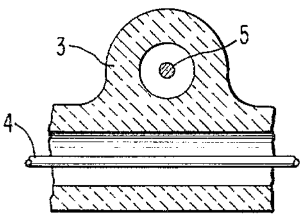
FIGURE 2 is a cross sectional view showing another type of intersection of ceramic ferrite material and two conducting wires.

FIGURE 2 is a cross sectional view disclosing another type of intersection of a sintered array of ceramic ferrite material. The conducting wire 4 is perpendicular to conducting wire 5 and cross each other at the intersection but are separated from each other by sintered ceramic ferrite material. The thickness of this separating ferrite material is not greater than the wall thickness of one shell covering of ferrite material.

Figure 3:
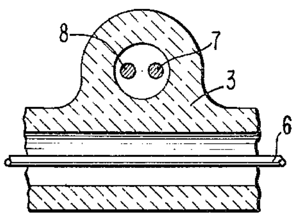
FIGURE 3 is a cross sectional view showing another type of intersection of ceramic ferrite material and three conducting wires.

In the cross sectional view of FIGURE 3 another type of intersection of ceramic ferrite material with three conductive wires is shown. In this intersection conducting wire 6 is perpendicular to conducting wires 7 and 8 and is separated from conducting wires 7 and 8 by sintered ceramic ferrite material which has a thickness not greater than the thickness of a single shell covering of ferrite material. Wire conductors 7 and 8 are parallel but electrically insulated from each other in the same passage.

The structures described above are prepared by the following examples.

EXAMPLE I

A 5-mil diameter platinum wire (0.005 inch) is built up to a 10-mil diameter by coating with a polyethylene wax (e.g., Epolene C–10) by passing the wire vertically through a liquid bath of the polyethylene wax and then through a warm die having a 12-mil inside diameter (0.012 inch), the wax coated wire is then passed through a ferrite-resin mixture composed of calcined ferrite powder, $Fe_{1.7}Mn_{1.26}Cu_{.04}O_4$ present in an amount of 35 grams. The mixture also contains 6 grams of pine oil and 9.0 grams of a mixture having a viscosity of 250 centipoises comprising 8.1 grams of an epoxy resin prepared by reacting bisphenol A and epichlorohydrin and 0.9 gram triethylene tetramine.

The rate of passage of the wire through this liquid mixture is such as to produce a 5-mil coating thickness immediately following the coating step. The coated wires are mounted in parallel alignment on an open frame (0.050 inch on centers). A similar frame of coated wires is arranged on a second frame. The two frames are oriented in a fixture so that the first series of coated wires is perpendicular to the second series of coated wires. The two frames are then pressed together in such a manner that the corresponding ferrite-resin mixture coatings surrounding the wire conductors are joined. This assembly is allowed to dry on the frame, for instance specifically 15 minutes at 100° C. Then, the edges of the partially cured array are cut from the frame. The temperature of this array is raised from room temperature to 600° C. in a period of two hours. It is held at 600° C. for one hour. The resin and organic components are pyrolyzed and burned in this step. The array is then heated from 600° C. to 1150° C. in a period of one hour. It is held at 1150° C. for 20 minutes. It is cooled to 1000° C. in 20 minutes, held at 1000° C. for 10 minutes and then rapidly cooled to room temperature. Thus, a sintered ferrite array of magnetic storage elements has been prepared which has a structure similar to that shown in FIGURE 1.

EXAMPLE II

A 5-mil diameter silver wire is coated with a paraffin wax by passing the wire vertically through a liquid bath of the paraffin wax until a 10-mil diameter is achieved. The wax-finished wire is then drawn through a warm die having a 12-mil inside diameter. Now, the wax-coated silver wire is passed through a ferrite-resin mixture composed as follows:

| | Grams |
|---|---|
| Calcined ferrite powder ($Fe_{1.7}Mn_{.6}Mg_{.7}O_4$) | 40.0 |
| Castor oil | 5.0 |
| 1,2 epoxy resin prepared by reacting epichlorohydrin and bisphenol A | 9.0 |
| 4,4′ methylene dianiline | 1.0 |

The coated wire passes through this ferrite-resin mixture at a rate sufficient to produce a 5-mil coating thickness. These ferrite-resin mixture coated wires are then mounted in parallel alignment in an open frame (0.050 inch on centers). A similar alignment of these coated wires is mounted on a second frame. The two frames are then oriented in a fixture so that the first series of coated wires is perpendicular to the second series of coated wires. The frames are then pressed together until the ferrite-resin coated waxed wires are in tangential contact. The frames are then carefully separated to a discrete distance to allow the ferrite-resin mixture coating to flow into the space between the wax-coated wires. The assembly is allowed to dry for 30 minutes at 100° C. The edges of the partially cured array are cut from the frame. The temperature of the array is raised from room temperature to 600° C. in a period of two hours. To complete the removal of the volatile coating constituents, it is held at a temperature of 600° C. for one hour. The temperature of the array is then raised from 600° C. to 1200° C. in a period of one hour. It is held at 1200° C. for one hour, cooled to 1000° C. in 20 minutes and then held at 1000° C. for 10 minutes. Thereafter it is rapidly air quenched to cool. The connected array of magnetic storage elements thus prepared has a structure similar to that shown in FIGURE 2.

EXAMPLE III

Five-mil copper wire precoated with a .001 to .003 inch refractory oxide coating material ($Mn_{2.5}Al_{.5}O_4$) is wax-coated by passing the wires vertically through a liquid bath of beeswax to produce a total diameter of the coated wires of 13–14 mils. This coated wire is then drawn through a warm die having a 15-mil inside diameter. The wax-coated wires are then passed through a ferrite-resin mixture composed of:

| | Grams |
|---|---|
| Calcined ferrite powder ($Fe_{1.65}Mn_{0.95}Cr_{.10}Zn_{.25}Cu_{.02}O_4$) | 35 |
| Butyl glycidyl ether | 35 |
| Pine oil | 1.5 |
| Reaction product of epichlorohydrin and bisphenol A | 8.0 |
| Modified aromatic amine hardener | 2.0 |
| Ethylene oxide adduct of 4,4′-methylene dianiline | 4.5 |

until a 5-mil coating thickness is obtained. These coated wires are then mounted in parallel alignment on an open frame.

The above coating procedure is repeated starting with two 5-mil wires, each having a refractory oxide coating of .001 to .003 inch thickness, which are twisted together to form a pair (2 to 5 turns per inch). This pair is then passed vertically through a liquid bath of beeswax and a warm die having an inside diameter of .30 inch to produce a total diameter of the twisted pair of 26–28 mils. These twisted wax coated wires are then passed through the ferrite-resin mixture described above and mounted in parallel alignment on a second frame. The two frames are oriented in a fixture so that the first series of single coated wires is perpendicular to the second series of twisted pairs of coated wires. The two frames are pressed together until the waxed wires are in tangential contact. Then the frames are carefully separated to a discrete distance to allow the ferrite-resin mixture shell coating to flow into the space between the wax-coated wires. The assembly is then allowed to dry on the frame for 2 hours at 75° C. The edges of the partially cured array are cut from the frame. The temperature of this array is raised from room temperature to 600° C. in a period of 2 hours. It is held at 600° C. for 1 hour and then the temperature of the array is raised to 1000° C. in 1 hour and held at 1000° C. for 2 hours. It is then cooled to 900° C. in 20 minutes and held at 900° C. for 5 minutes. Thereafter it is rapidly air-quenched to room temperature. The sintered connected array of magnetic storage elements thus prepared has a structure similar to that shown in FIGURE 3. The conducting wires lie close together and in common passage in the array and are electrically insulated from each other.

EXAMPLE IV

An 8-mil diameter rayon polyfilament fiber is impregnated with a wax by passing the rayon polyfilament vertically through a warm wax bath 100° C. and through a warm sizing disc having a .012 inch inside diameter. This wax-coated fiber is then passed through a ferrite-resin mixture composed of:

| | Grams |
|---|---|
| Calcined ferrite powder ($Fe_{1.83}Mn_{1.08}Cr_{.09}O_4$) | 35 |
| Epoxidized castor oil | 4.0 |
| Methyl isobutyl ketone | 1.5 |
| Epoxy resin prepared by reacting epichlorohydrin and bisphenol A | 7.5 |
| 4,4′ methylene dianiline | 1.5 |

The coated fiber passes through this ferrite-resin mixture at a rate sufficient to produce a 5-mil coating thickness. These ferrite-resin mixture coating fibers are then mounted in parallel alignment in an open frame (0.050 inch on centers). A similar alignment of these coated fibers is mounted on a second frame. The two frames are then oriented in a fixture so that the first series of coated fibers is perpendicular to the second series of coated fibers. The frames are then pressed together until the ferrite-resin coated waxed fiber are in tangential contact. The frames are then carefully separated to a discrete distance to allow the ferrite-resin mixture coating to flow into the space between the wax-coated fibers. The assembly is allowed to dry for 15 minutes at 100° C. The edges of the partially cured array are removed from the frame. The temperature of the array is raised from room tempeature to 600° C. in a period of 2 hours. To complete the removal of the coating constituents, substrate rayon fiber, it is held at a temperature of 600° C. for one hour. The temperature of the array is then raised from 600° C. to 1300° C. in a period of 1 hour. It is held at 1300° C. for 30 minutes, cooled to 1050° C. in 20 minutes and then held at 1050° C. for 5 minutes. Thereafter it is rapidly air-quenched to cool. The sintered ferrite array produced in this manner has a passage left wherever the rayon fiber was positioned. Each of the passages left by the fibers is then threaded with insulated copper wire to complete the array fabrication. The above treated can be used to prepare connected arrays of ferrite elements in any of the passages where it is desirous to have one or more than one wire.

The structure herein provided by this method may be employed to construct a word-organized memory. That is, one set of conductors may be utilized as the word column conductors while the other set of conductors may be utilized as the bit row conductors similar to the type memory disclosed in copending application Serial No. 206,356, filed June 29, 1962, entitled "Magnetic Memory" by Robert F. Elfant and Kurt R. Grebe, and assigned to the assignee of this application and incorporated herein by reference. The word column conductors and the bit row conductor here shown may be connected to pulse generators and switching devices similar to that disclosed in the above cited copending application. As is shown in the FIGURE 3 herein and described in the copending application, if desired, a third wire may be employed for the sensing function rather than using a single wire to provide both function of drive and sense. The three-wire system thereby eliminates the need for external switching circuitry.

It has been found that the geometrical arrangement of the array and intersections described in this application are preferred for optimum magnetic storage in magnetic memories. It has been found that when the parallel sets of passages through which the wires pass are separated by more than a single shell thickness of ferrite material, or if the same passages are brought into completely intersecting relationship, that difficulty is encountered in distinguishing between stored binary "ones" and "zeros."

In summary, connected arrays of magnetic circuit elements are prepared by coating a conductor with a wax-like material, then coating with a ferrite resin mixture, next arranging a first series of the thus-coated conductors on a frame, orienting said frame at 90° to a second series of coated conductors on another frame, joining the oriented cross conductors, followed by curing and sintering this structure. The connected arrays of magnetic circuit elements thus prepared in the region of the cross points of the wire conductors have properties suitable for magnetic storage in digital computer mechanisms.

While the invention has been particularly shown and described with reference to a preferred embodiment thereof, it will be understood by those skilled in the art that various changes in form and details may be made therein without departing from the spirit and scope of the invention:

What is claimed is:

1. A magnetic memory array comprising:
- a first series of individual elements of magnetic material extending in parallel spaced relationship in the first direction;
- a second series of individual elements of magnetic material extending in parallel spaced relationship in a second direction;
- a first plurality of conductors each extending in said first direction through one of said elements in said first series;
- a second plurality of conductors each extending in said second direction through one of said magnetic elements in said second series;
- said magnetic elements in said second series being arranged to intersect a first side of said magnetic elements in said first series;
- said magnetic elements in said second series being joined to and penetrating said first sides of said magnetic elements in said first series to form at each intersection a first portion of magnetic material having a first thickness between the conductors at the intersection;
- each of said elements in said first series at each intersection having a second portion of magnetic material different from said first portion;
- said second portion of magnetic material having a second thickness equal to or greater than said first thickness of said first portion of magnetic material.

2. The magnetic memory array of claim 1 wherein at each intersection said second portion of magnetic material of the element in said first series and said first portion of said magnetic material together enclose the conductor extending through the element in said first series.

3. The magnetic memory array of claim 1 wherein each of said elements in said second series has at each intersection a third portion of magnetic material different from said first portion, said third portion of magnetic material having a third thickness equal to or greater than said first thickness of said first portion of magnetic material.

4. The magnetic memory array of claim 3 wherein at each intersection said third portion of magnetic material of each element in said second series and said first portion of magnetic material together enclose the conductor in said second series extending through the element in said second series.

5. The magnetic memory array of claim 4 wherein at each intersection said second thickness of the second portion of each element in said first series is substantially equal to said third thickness of the third portion of the element in said second series.

6. The memory array of claim 1 wherein said first direction is essentially at right angles to said second direction.

7. A magnetic memory array comprising:
- a first series of individual elements of magnetic material extending in parallel spaced relationship in a first direction;
- a first plurality of conductors each extending in said first direction through one of said elements in said series;
- a second plurality of conductors each extending in parallel spaced relationship in a second direction substantially at right angles to said first direction;
- said conductors in said second plurality being arranged to intersect a first side of said magnetic elements;
- said conductors each at intersections penetrating said first sides of said magnetic elements to form at each intersection a first portion of magnetic material having a first thickness between the conductors at the intersection;
- each of said magnetic elements at each intersection having a second portion of magnetic material different from said first portion;
- said second portion of magnetic material having a second thickness equal to or greater than said first thickness of said first portion of said magnetic material.

References Cited by the Examiner

UNITED STATES PATENTS

| | | | |
|---|---|---|---|
| 2,792,563 | 5/1957 | Rajchman | 340—174 |
| 2,985,948 | 5/1961 | Peters | 29—155.5 |
| 3,031,649 | 4/1962 | Snyder et al. | 340—174 |
| 3,100,295 | 8/1963 | Schweizerhof | 340—174 |

IRVING L. SRAGOW, *Primary Examiner.*